US012527931B2

United States Patent
Muse et al.

(10) Patent No.: US 12,527,931 B2
(45) Date of Patent: Jan. 20, 2026

(54) MACHINE LEARNING TECHNIQUES FOR OPTIMIZED BREATHING THERAPY

(71) Applicant: UnitedHealth Group Incorporated, Minnetonka, MN (US)

(72) Inventors: Jon Kevin Muse, Thompsons Station, TN (US); Marilyn L. Gordon, Cherry Hill, NJ (US); Komal Khatri, Cedar Park, TX (US); Gregory J. Boss, Saginaw, MI (US)

(73) Assignee: UNITEDHEALTH GROUP INCORPORATED, Minnetonka, MN (US)

( * ) Notice: Subject to any disclaimer, the term of this patent is extended or adjusted under 35 U.S.C. 154(b) by 1034 days.

(21) Appl. No.: 17/516,167

(22) Filed: Nov. 1, 2021

(65) Prior Publication Data

US 2023/0132428 A1    May 4, 2023

(51) Int. Cl.
*A61M 16/00*    (2006.01)
*A61B 5/08*    (2006.01)
*G06N 20/00*    (2019.01)

(52) U.S. Cl.
CPC ............ *A61M 16/024* (2017.08); *A61B 5/08* (2013.01); *A61M 16/0003* (2014.02); *G06N 20/00* (2019.01); *A61M 2205/581* (2013.01)

(58) Field of Classification Search
CPC ............ A61M 16/024; A61M 16/0003; A61M 2205/581; A61B 5/08; A61B 5/091; A61B 5/486; A61B 5/7267; A61B 5/0806; A61B 5/113; G06N 20/00; G16H 40/63; G16H 50/20; G16H 20/30
See application file for complete search history.

(56) References Cited

U.S. PATENT DOCUMENTS

| 8,738,370 | B2 | 5/2014 | Mitsuyoshi et al. |
| 8,907,195 | B1 | 12/2014 | Erol |
| 9,564,061 | B2 | 2/2017 | Kirkpatrick |
| 9,881,515 | B2 | 1/2018 | Moreno |
| 2004/0194610 | A1 | 10/2004 | Davis |

(Continued)

FOREIGN PATENT DOCUMENTS

WO    WO-2016074042 A1 *   5/2016   ........... A61B 5/0205

OTHER PUBLICATIONS

Canga, Bernardo et al. "AIR: Advances in Respiration—Music Therapy in the Treatment of Chronic Pulmonary Disease," vol. 109, Issue 12, Dec. 2015, pp. 1532-1539, DOI: 10.1016/j.rmed.2015.10.001.

(Continued)

*Primary Examiner* — Eric F Winakur
*Assistant Examiner* — Sienna C Pyle
(74) *Attorney, Agent, or Firm* — Alston & Bird LLP

(57) ABSTRACT

Various embodiments of the present invention provide methods, apparatus, systems, computing devices, computing entities, and/or the like for performing optimized breathing therapy. Certain embodiments of the present invention utilize systems, methods, and computer program products that perform optimized breathing therapy using at least one of interruption score generation machine learning models, observed inspiration-expiration pattern, expected inspiration-expiration patterns, expected musical patterns, and inferred musical patterns.

20 Claims, 11 Drawing Sheets

(56) References Cited

U.S. PATENT DOCUMENTS

| | | | |
|---|---|---|---|
| 2005/0209503 A1* | 9/2005 | Elliott | A61B 5/02405 |
| | | | 600/26 |
| 2013/0220101 A1 | 8/2013 | Lemons | |
| 2017/0202507 A1* | 7/2017 | Plans Casal | A61B 5/35 |
| 2019/0189259 A1 | 6/2019 | Clark | |
| 2022/0104724 A1* | 4/2022 | Cates | A61B 5/02233 |

OTHER PUBLICATIONS

Vaudreuil, Rebecca et al. "Music Therapy Applied to Complex Blast Injury in Interdisciplinary Care: A Case Report," Disability and Rehabilitation, vol. 41, No. 19, pp. 2333-2342, Apr. 24, 2018, DOI: 10.1080/09638288.2018.1462412.

Yanagida, Masuzo et al. "Automatic Scoring of Sung Melodies in Comparison With Human Performance," Proceedings of 20th International Syjposium on Music Acoustics (Associated Meeting of the International Congress On Acoustics), Aug. 25-31, 2010, (8 pages), Sydney and Katoomba, Australia.

\* cited by examiner

MACHINE LEARNING TECHNIQUES FOR OPTIMIZED BREATHING THERAPY

BACKGROUND

Various embodiments of the present invention address technical challenges related to performing breathing therapy. Various embodiments of the present invention disclose innovative techniques for efficiently and effectively performing optimized breathing therapy using various predictive data analysis techniques.

BRIEF SUMMARY

In general, various embodiments of the present invention provide methods, apparatus, systems, computing devices, computing entities, and/or the like for performing optimized breathing therapy. Certain embodiments, of the present invention utilize systems, methods, and computer program products that perform optimized breathing therapy using at least one of interruption score generation machine learning models, observed inspiration-expiration pattern, expected inspiration-expiration patterns, expected musical patterns, and inferred musical patterns.

In accordance with one aspect, a method is provided. In one embodiment, the method comprises: identifying an observed inspiration-expiration pattern based at least in part on observed breathing data for a monitored individual, wherein the observed inspiration-expiration pattern is associated with an expected musical pattern, and wherein the expected musical pattern is associated with a plurality of expected musical notes; generating based at least in part on the observed inspiration-expiration pattern, a plurality of inspiration-expiration pattern segments of the observed inspiration-expiration pattern, wherein each inspiration-expiration pattern segment is associated with an expected musical note of the plurality of expected musical notes; for each inspiration-expiration pattern segment: determining utilizing an interruption score generation machine learning model, a predicted interruption score; determining an inferred musical note based at least in part on the predicted interruption score; and mapping the inspiration-expiration pattern segment to the inferred musical note; generating an inferred musical pattern for the observed inspiration-expiration pattern based at least in part on each inferred musical note; generating audio data based at least in part on the inferred musical pattern, wherein the audio data is configured to be presented using a client computing entity (e.g., client computing entity 102) associated with the monitored individual; and performing one or more prediction-based actions based at least in part on the predicted interruption score.

In accordance with another aspect, a computer program product is provided. The computer program product may comprise at least one computer-readable storage medium having computer-readable program code portions stored therein, the computer-readable program code portions comprising executable portions configured to: identify an observed inspiration-expiration pattern based at least in part on observed breathing data for a monitored individual, wherein the observed inspiration-expiration pattern is associated with an expected musical pattern, and wherein the expected musical pattern is associated with a plurality of expected musical notes; generate based at least in part on the observed inspiration-expiration pattern, a plurality of inspiration-expiration pattern segments of the observed inspiration-expiration pattern, wherein each inspiration-expiration pattern segment is associated with an expected musical note of the plurality of expected musical notes; for each inspiration-expiration pattern segment: determine, utilizing an interruption score generation machine learning model, a predicted interruption score; determine an inferred musical note based at least in part on the predicted interruption score; and map the inspiration-expiration pattern segment to the inferred musical note; generate an inferred musical pattern for the observed inspiration-expiration pattern based at least in part on each inferred musical note; generate audio data based at least in part on the inferred musical pattern, wherein the audio data is configured to be presented using a client computing entity associated with the monitored individual; and perform one or more prediction-based actions based at least in part on the predicted interruption score.

In accordance with yet another aspect, an apparatus comprising at least one processor and at least one memory including computer program code is provided. In one embodiment, the at least one memory and the computer program code may be configured to, with the processor, cause the apparatus to: identify an observed inspiration-expiration pattern based at least in part on observed breathing data for a monitored individual, wherein the observed inspiration-expiration pattern is associated with an expected musical pattern, and wherein the expected musical pattern is associated with a plurality of expected musical notes; generate based at least in part on the observed inspiration-expiration pattern, a plurality of inspiration-expiration pattern segments of the observed inspiration-expiration pattern, wherein each inspiration-expiration pattern segment is associated with an expected musical note of the plurality of expected musical notes; for each inspiration-expiration pattern segment: determine, utilizing an interruption score generation machine learning model, a predicted interruption score; determine an inferred musical note based at least in part on the predicted interruption score; and map the inspiration-expiration pattern segment to the inferred musical note; generate an inferred musical pattern for the observed inspiration-expiration pattern based at least in part on each inferred musical note; generate audio data based at least in part on the inferred musical pattern, wherein the audio data is configured to be presented using a client computing entity associated with the monitored individual; and perform one or more prediction-based actions based at least in part on the predicted interruption score.

BRIEF DESCRIPTION OF THE DRAWINGS

Figure 1:
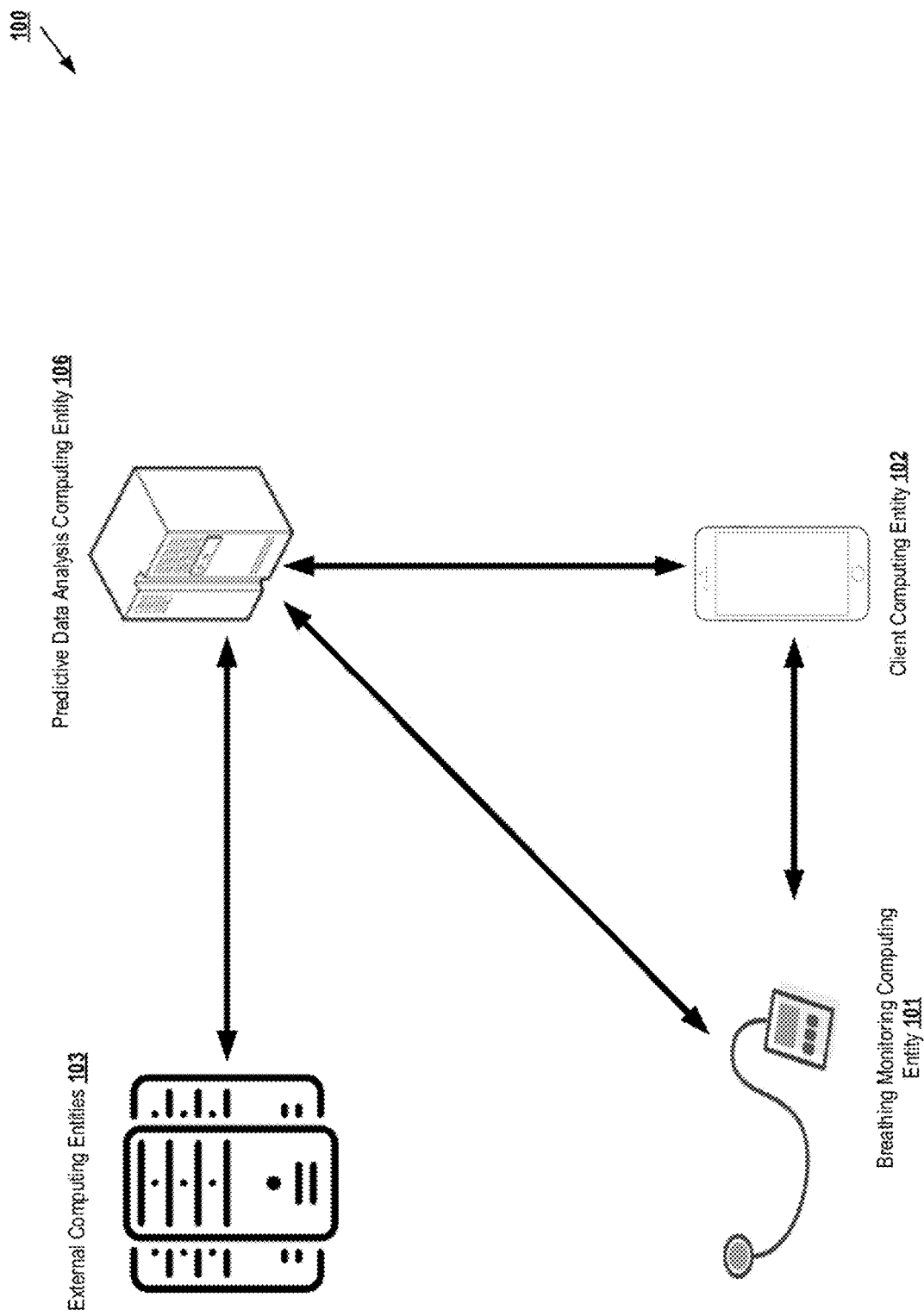

Having thus described the invention in general terms, reference will now be made to the accompanying drawings, which are not necessarily drawn to scale, and wherein:

FIG. 1 provides an exemplary overview of a hardware architecture that can be used to practice embodiments of the present invention.

Figure 2:
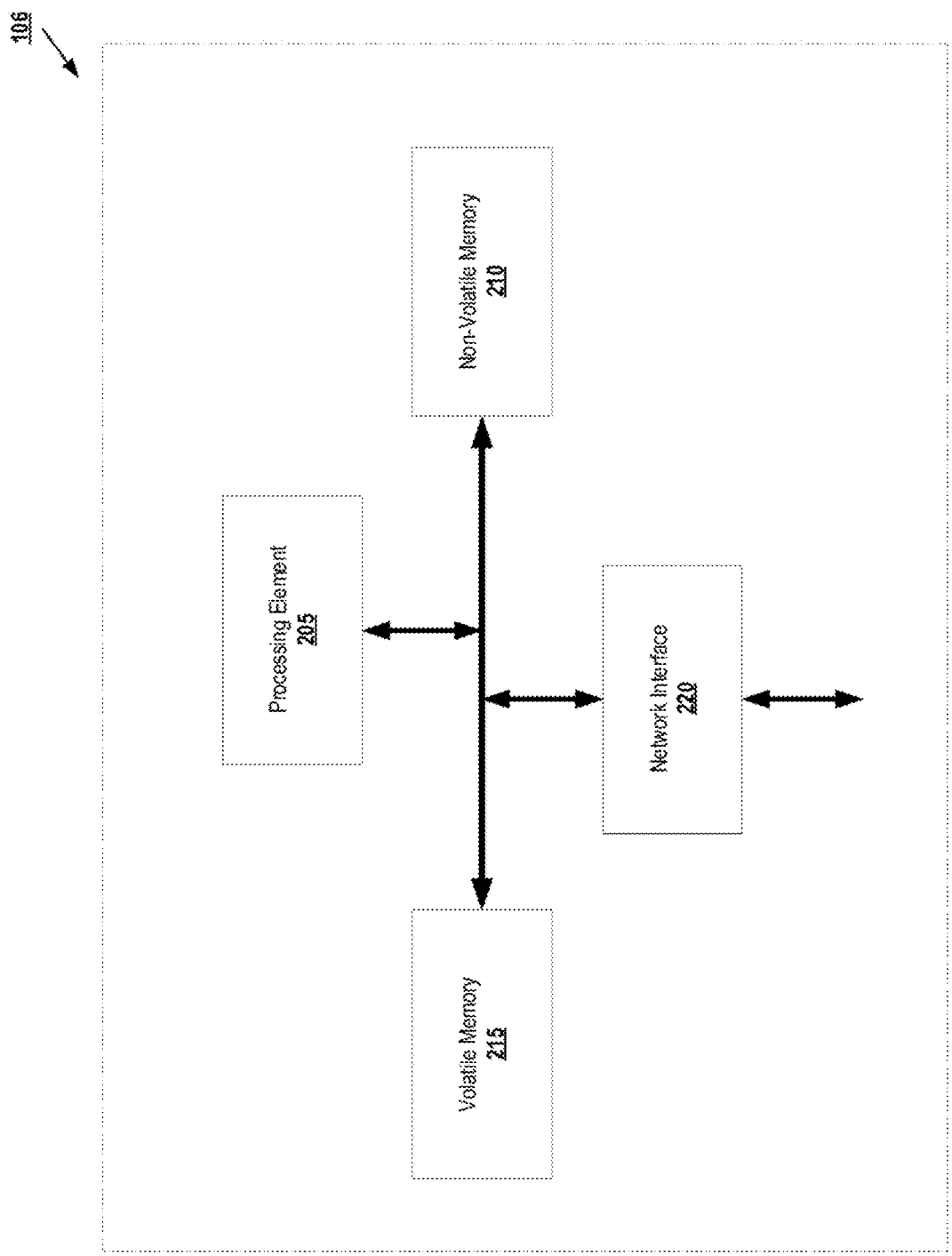

FIG. 2 provides an example predictive data analysis computing entity, in accordance with some embodiments discussed herein.

Figure 3:
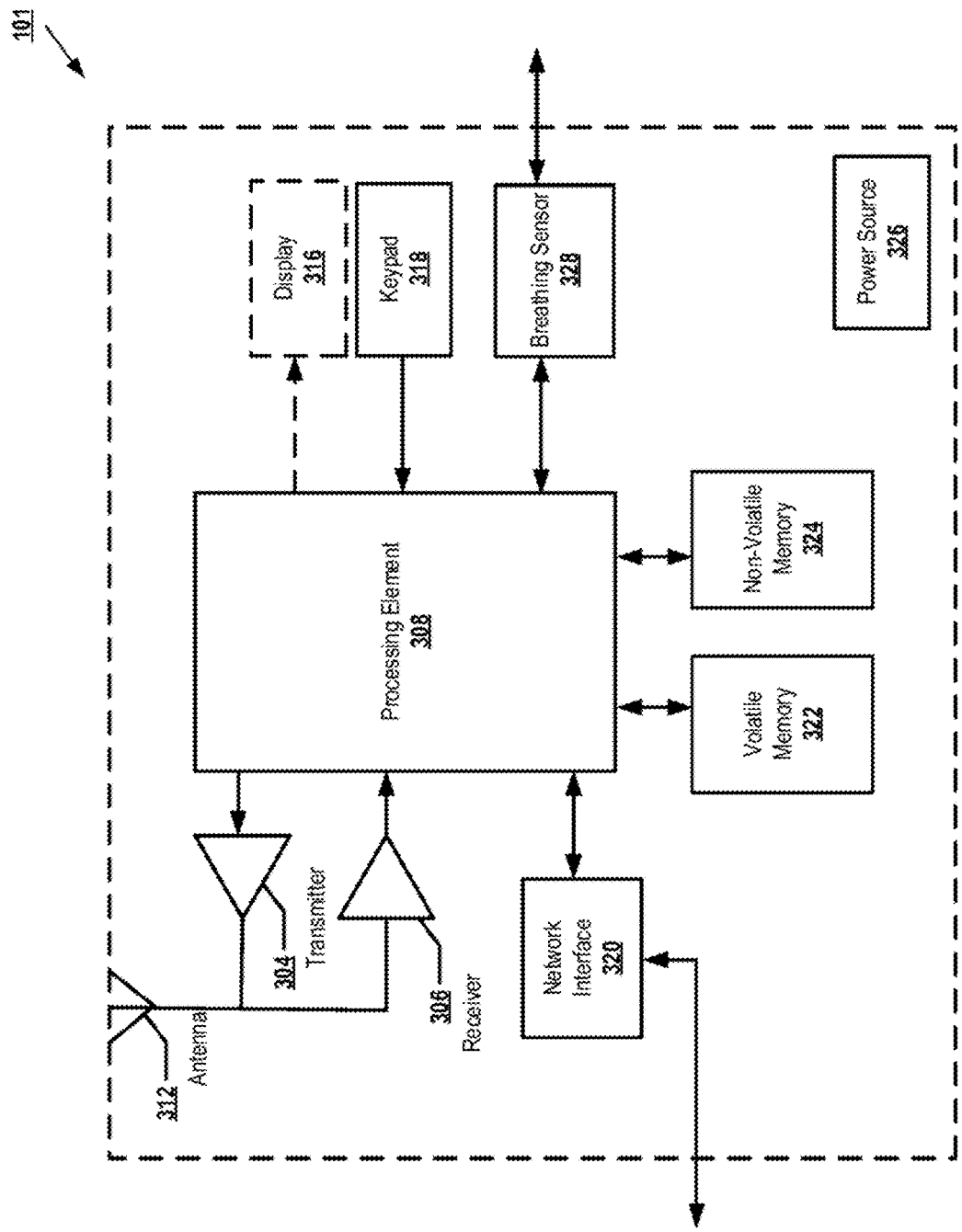

FIG. 3 provides an example breathing monitoring computing entity, in accordance with some embodiments discussed herein.

Figure 4:
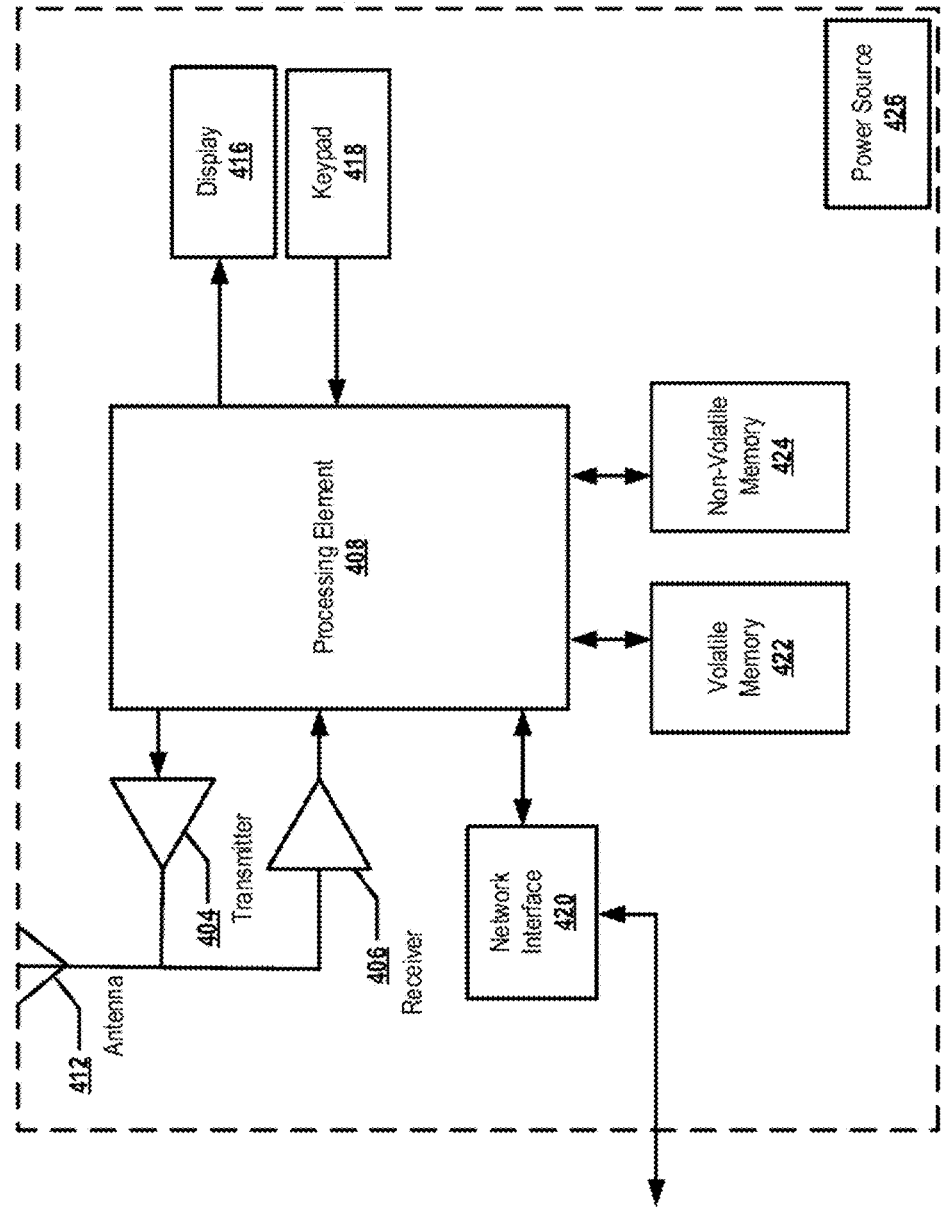

FIG. 4 provides an example client computing entity, in accordance with some embodiments discussed herein.

Figure 5:
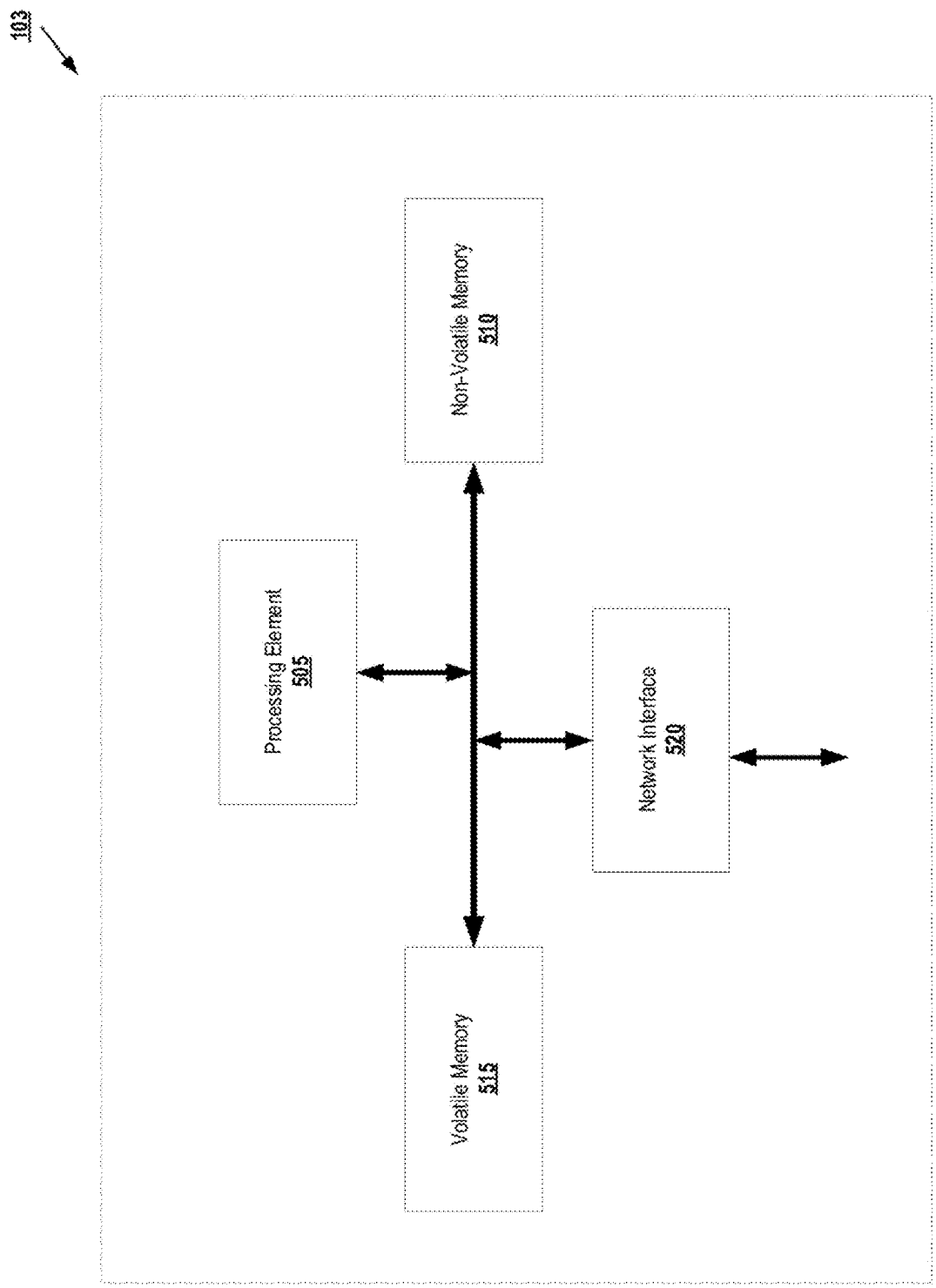

FIG. 5 provides an example external computing entity, in accordance with some embodiments discussed herein.

Figure 6:
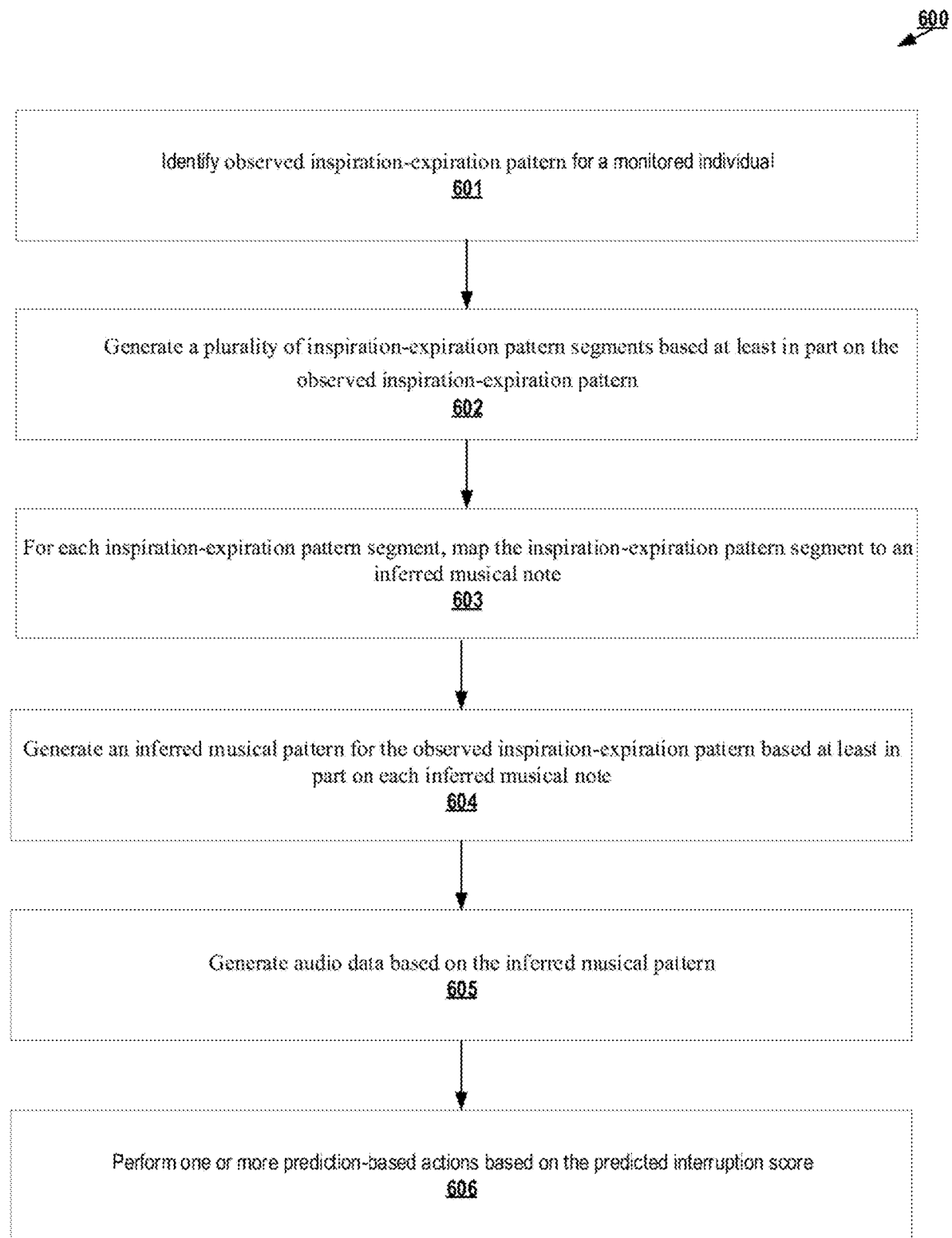

FIG. 6 is a flowchart diagram of an example process for generating inspiration-expiration pattern segments, in accordance with some embodiments discussed herein.

Figure 7:
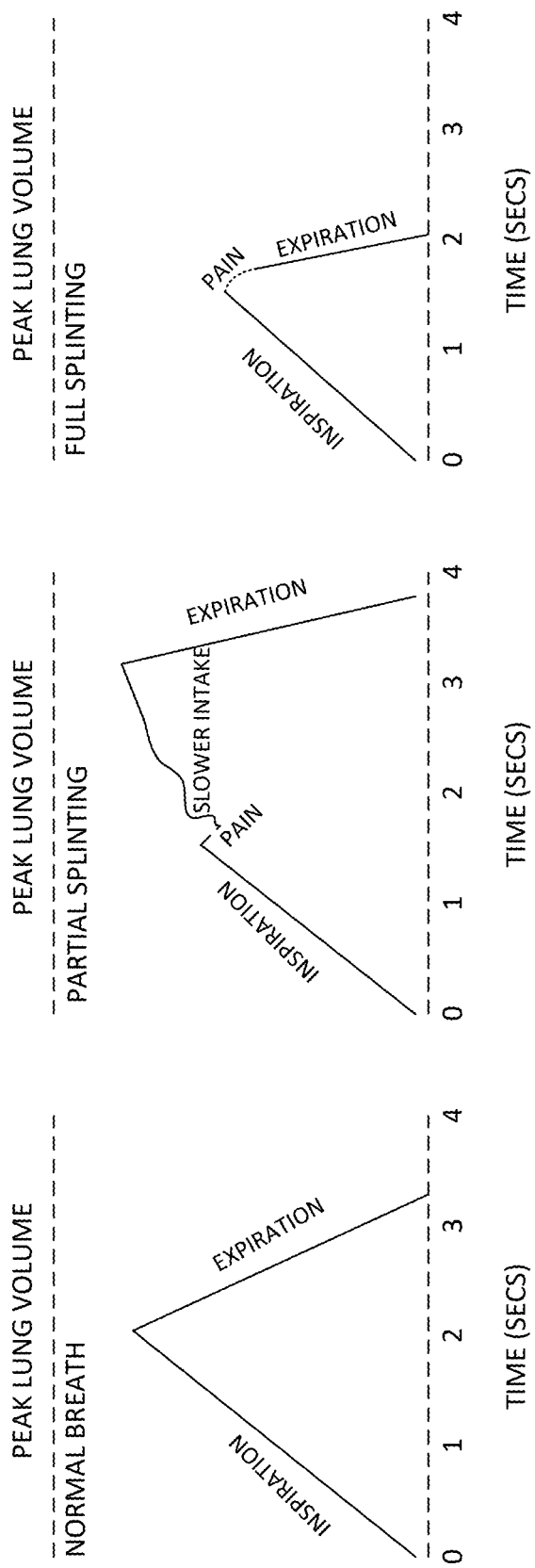

FIG. 7A-7C provide operational examples of observed inspiration-expiration pattern, in accordance with some embodiments discussed herein.

Figure 8:
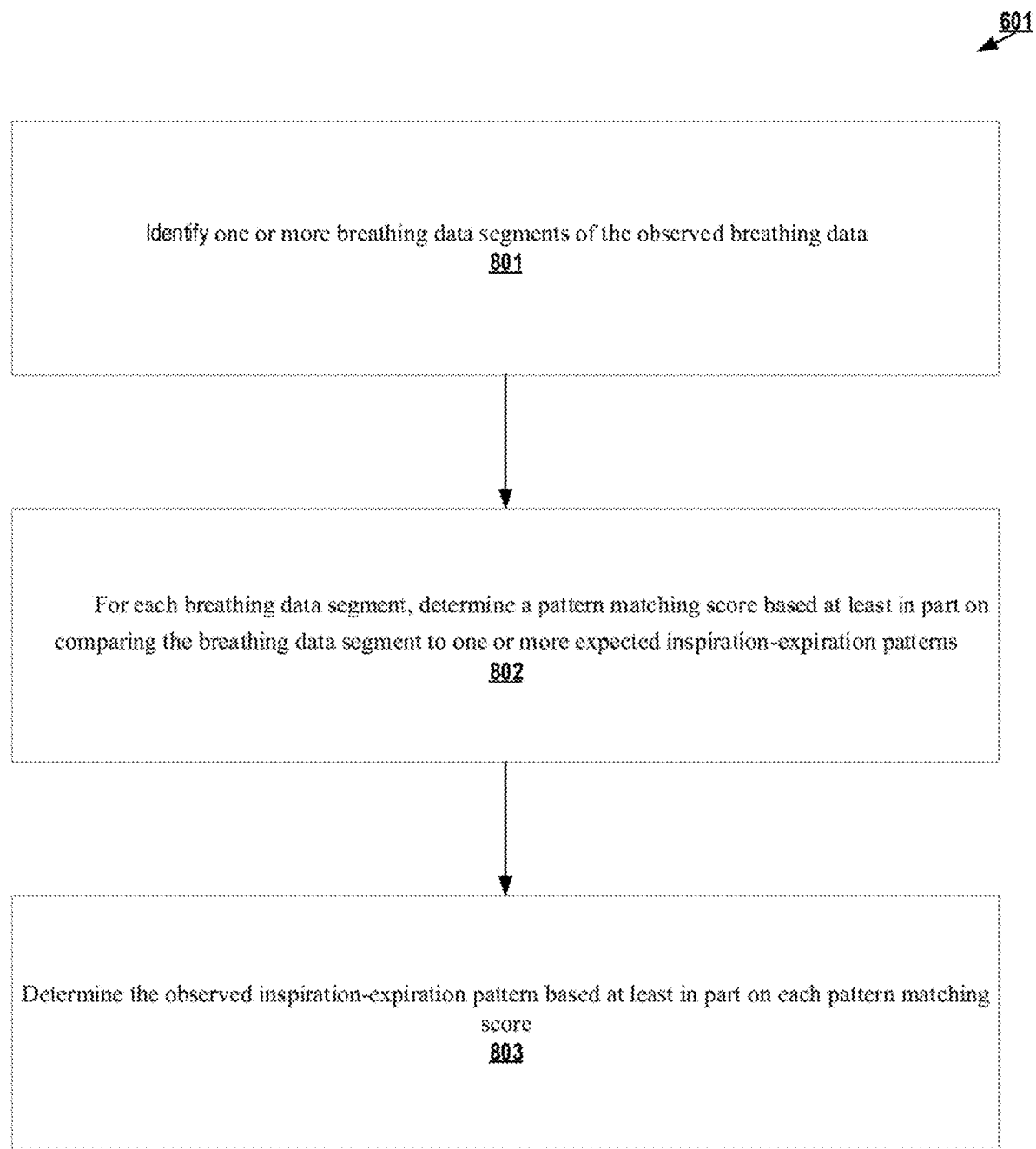

FIG. 8 is flowchart diagram of an example process for identifying an observed inspiration-expiration pattern based at least in part on an observed breathing data, in accordance with some embodiments discussed herein.

Figure 9:
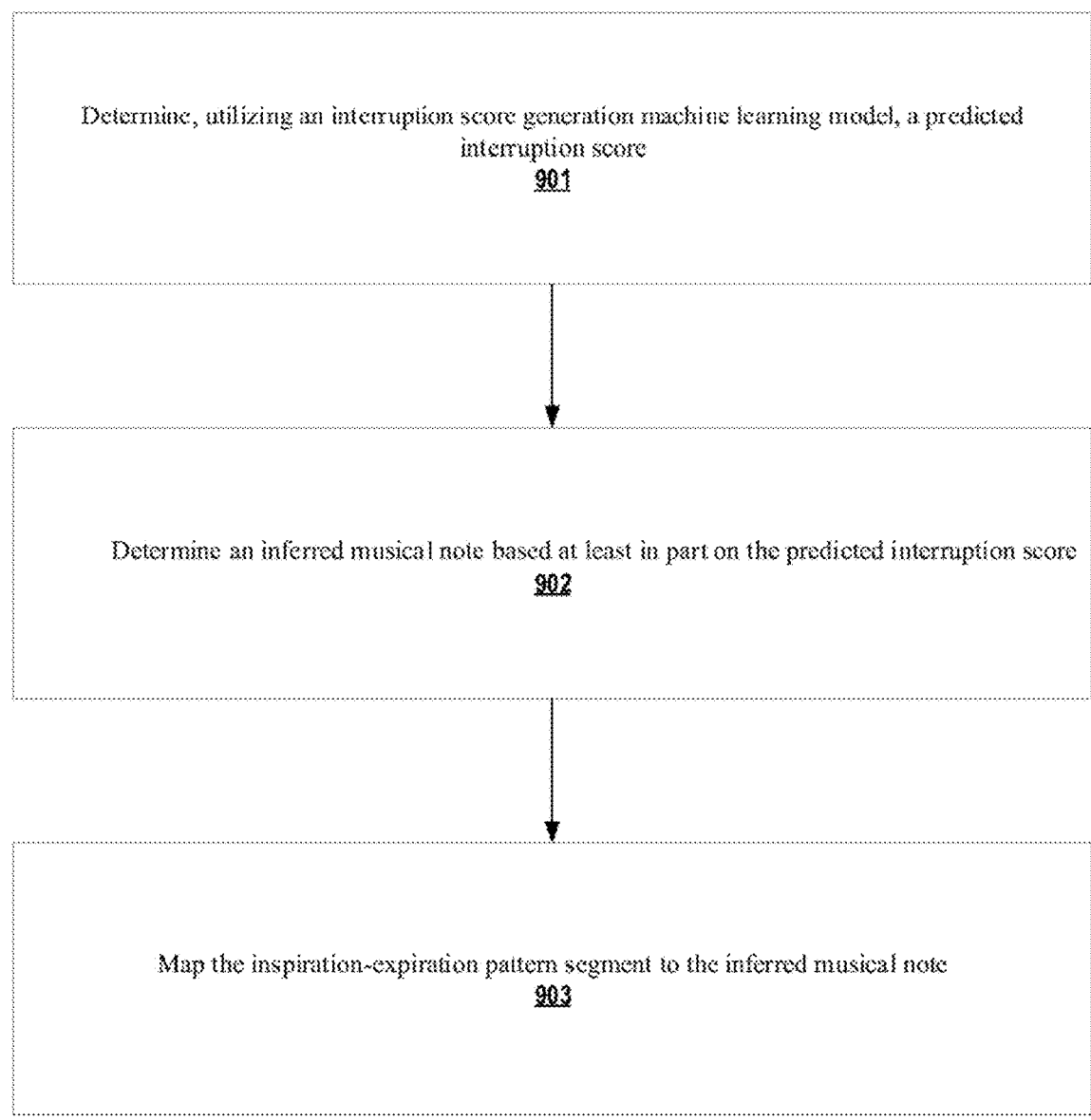

FIG. 9 is a flowchart diagram of an example process for mapping an inspiration-expiration pattern segment to an inferred musical note, in accordance with some embodiments discussed herein.

Figure 10:
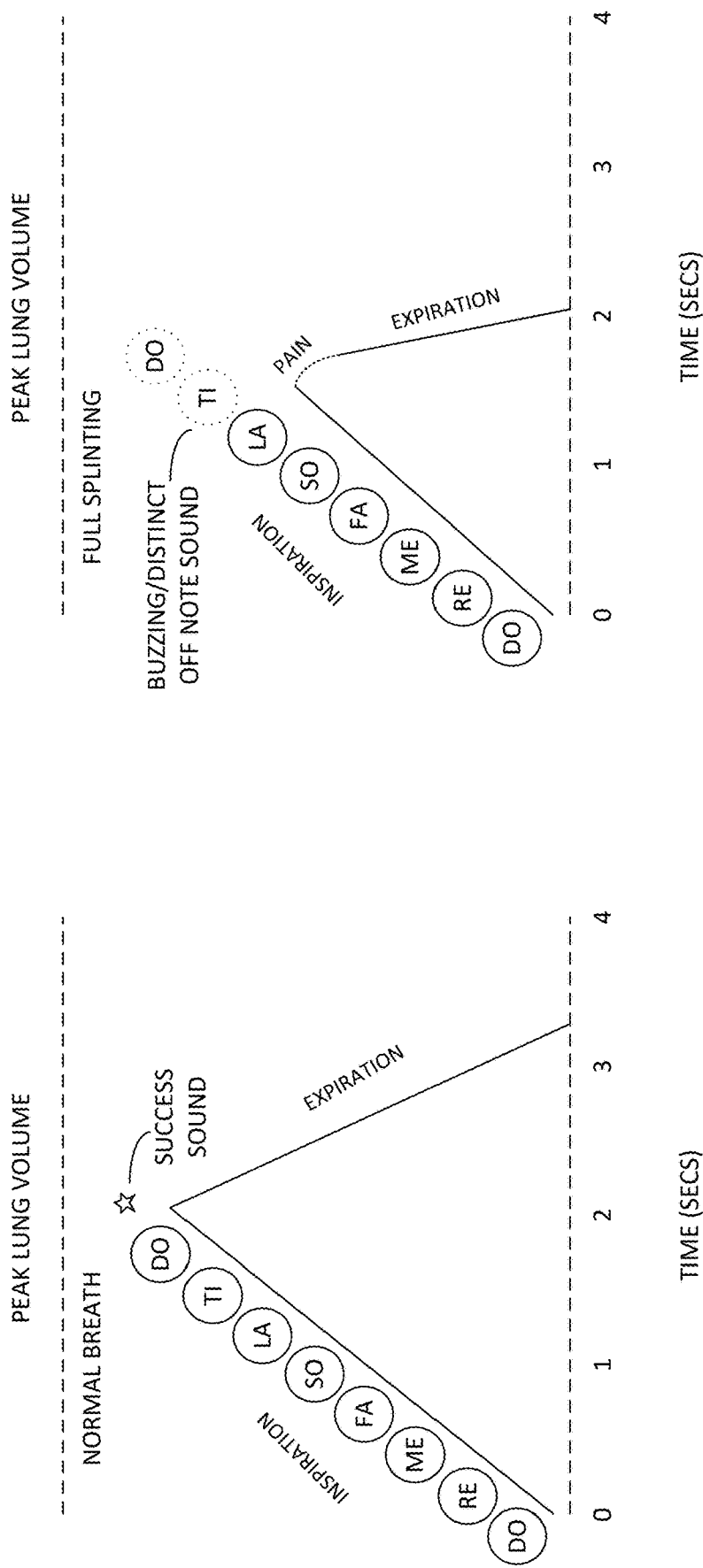

FIGS. 10A and 10B provide operational examples of inferred musical patterns, in accordance with some embodiments discussed herein.

Figure 11:
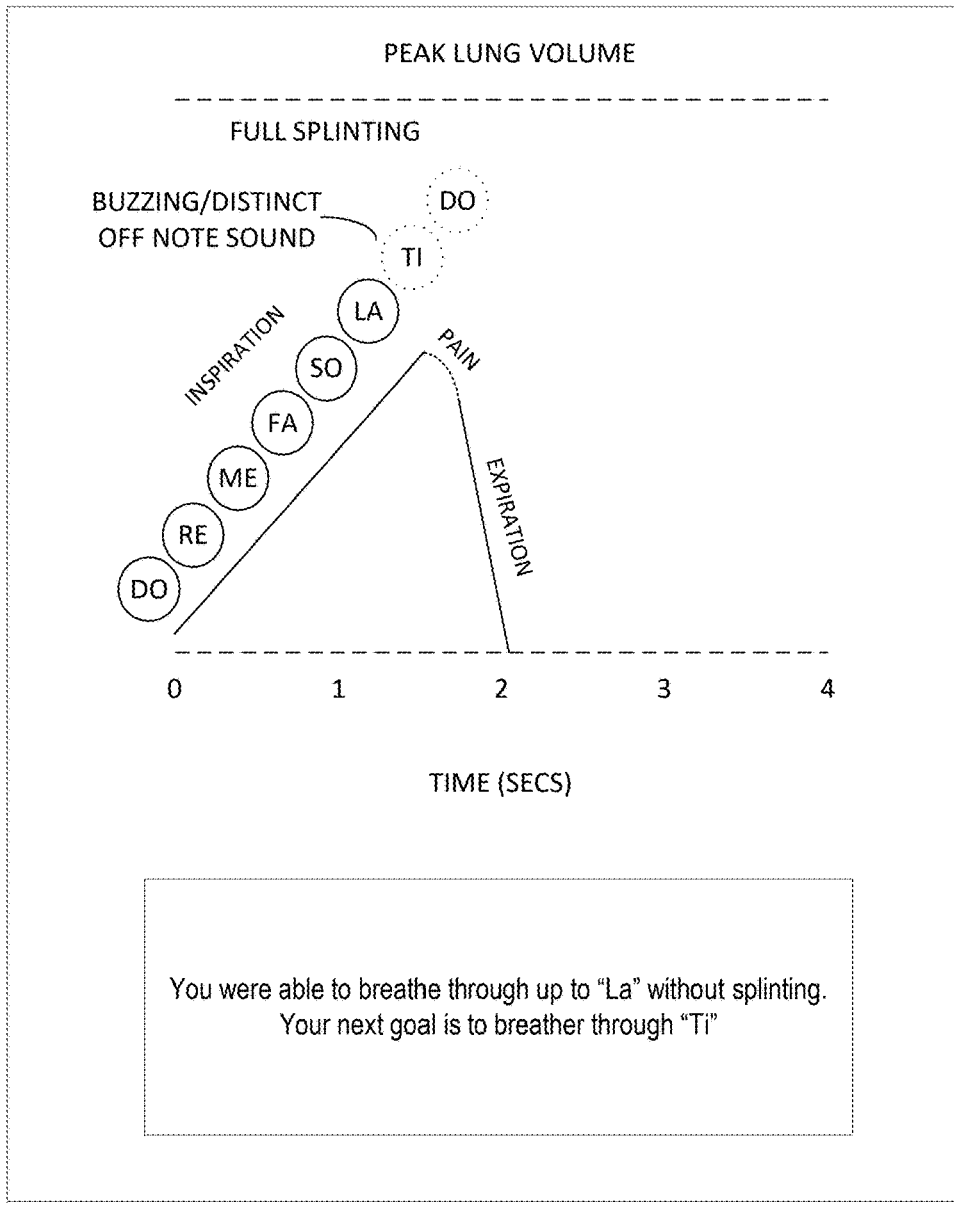

FIG. 11 provides an example user interface for displaying one or more notifications, in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW AND TECHNICAL IMPROVEMENTS

Various embodiments of the present invention address technical challenges related to efficiently and effectively performing breathing therapy based at least in part on observed breathing data for a monitored individual. The disclosed techniques improve the efficiency and effectiveness of optimized breathing therapy by utilizing an interruption score generation machine learning model that is configured to compare an observed inspiration-expiration pattern segment that is generated based at least in part on observed breathing data with the one or more expected inspiration-expiration patterns. The interruption score generation machine learning models utilize comparison operations that may, in at least some embodiments, reduce or eliminate the need for computationally expensive training operations in order to generate the noted interruption score generation machine learning models. By reducing or eliminating the noted training operations, various embodiments of the present invention: (i) reduces or eliminates the computational operations needed for training and thus improves the computational efficiency of performing optimized breathing therapy, (ii) reduces or eliminates the need for storage resources to train/generate interruption score generation machine learning models and thus improves storage efficiency of performing optimized breathing therapy, and (iii) reduces or eliminates the need for transmitting extensive training data needed to generate interruption score generation machine learning models and thus improves transmission/network efficiency of performing optimized breathing therapy. Via the noted advantages, various embodiments of the present invention make substantial technical contributions to the fields of breathing therapy in particular and healthcare-related predictive data analysis in general.

An exemplary application of various embodiments of the present invention relates to optimizing breathing therapy (e.g., challenge and therapy guided sessions), particularly of atelectasis patients. Atelectasis is one of the most common breathing (respiratory) complications after surgery. Patients generally will experience some form of pain when breathing. Atelectasis causes splinting in the body's effort to avoid pain. Improper breathing exercises or the lack of (with or without an incentive spirometer) can cause complications most commonly resulting in pneumonia, which can lead to death. Besides post-surgical patients, acute lung conditions or even those that are chronic put the patient at risk for lung pain that can result in serious illness or death if the patient does not follow proper lung care guidance. Concerning lung pain due to atelectasis or pleurisy, the patient may not be aware that they are coddling or compensating physically or mentally right away. Older patients and much younger patients at each end of the age spectrum are particularly at risk of this condition.

II. DEFINITIONS

The term "observed breathing data" may refer to a data object that describes one or more instances of breathing measurements for a corresponding monitored individual, where each instance of breathing measurements is associated with a corresponding inspiration-expiration cycle of the monitored individual. Examples of breathing measurements may include voltage signals corresponding to the inspiration and expiration of a monitored individual. In an example embodiment, the observed breathing data may be calculated using one or more breathing sensors, where the breathing sensors are configured to record breathing measurements and to transmit (e.g., wirelessly, through a wired transmission medium, and/or the like) the recorded breathing measurements to a computing device configured to store the breathing measurements and/or determine an inspiration-expiration pattern based at least in part on the breathing measurements. Examples of breathing sensors may include breathing sensors that are in direct contact with the monitored individual's body as well as breathing sensors that are not in direct contact with the monitored individual's body. For example, breathing sensors may be integrated and/or secured to a wearable device (e.g., a vest, shirt, body band, and/or the like). In example embodiments, the breathing sensors may include a stretch sensor integrated and/or secured to a stretchable wearable device positioned with respect to the diaphragm of the monitored individual, where the stretch sensor measures voltage signals corresponding to the stretch of the wearable device as the diaphragm of the monitored individual contracts and expands.

The term "observed inspiration-expiration pattern" may refer to a data object that describes the breathing pattern of a monitored individual with respect to an inspiration-expiration cycle of the monitored individual. For example, the inspiration-expiration pattern may describe a graphical representation (e.g., waveform) of an inspiration-expiration cycle of a corresponding monitored individual. In some embodiments, the observed inspiration-expiration pattern may be generated by processing the observed breathing data for the corresponding monitored individual. For example, a portion of the observed inspiration-expiration pattern may represent the observed inspiration of the corresponding monitored individual and another portion of the observed inspiration-expiration pattern may represent the observed expiration of the corresponding monitored individual. For example, in some embodiments, an observed inspiration-expiration pattern may be substantially triangular, where the left portion (e.g., the left half) of the substantially triangular observed inspiration-expiration pattern describes the observed inspiration pattern for the observed breathing data of the monitored individual and the right portion (e.g., the right half) of the substantially triangular observed inspiration-expiration pattern describes the observed expiration for the observed breathing data of the monitored individual.

The term "expected inspiration-expiration pattern" may refer to a data object that describes a normal breathing pattern of a monitored individual with respect to an inspiration-expiration cycle of the monitored individual. For example, an expected inspiration-expiration pattern may describe a breathing pattern of a monitored individual with respect to an inspiration-expiration cycle, where splinting activity was not experienced by the monitored individual during the inspiration-expiration cycle. As an example, an expected inspiration-expiration pattern may be generated by processing breathing data measured during a normal inspiration-expiration cycle of the monitored individual. For example, the breathing data may be measured during an inspiration-expiration cycle of the monitored individual under the supervision of a physician and/or the like, where the individual inspires and expires without an interruption in the inspiration-expiration cycle that is indicative of splinting activity. As another example, an expected inspiration-expiration pattern for a particular monitored individual may be generated, utilizing a machine learning model, based at least in part on one more expected inspiration-expiration patterns of other monitored individuals. In some embodiments, the expected inspiration-expiration pattern describes a graphical representation (e.g., waveform) of an expected inspiration-expiration cycle for the corresponding monitored individual. An example expected inspiration-expiration pattern may be substantially triangular, where the left portion (e.g., the left half) of the substantially triangular expected inspiration-expiration pattern describes the inspiration of the monitored individual and the right portion (e.g., the right half) of the substantially triangular expected inspiration-expiration pattern describes the expiration of the monitored individual.

The term "expected musical pattern" may refer to a data entity that describes a plurality of musical notes associated with an observed inspiration-expiration pattern. An example expected musical pattern may be Do-Re-Mi-Fa-So-La-Ti-Do. In some embodiments, each inspiration-expiration pattern segment is associated with an expected musical note of the plurality of musical notes. In some embodiments, the expected musical pattern may serve as an indicator (e.g., the primary indicator) for a breathing therapy session. For example, in some embodiments, the expected musical pattern may serve as the primary indicator of the progress of a monitored individual with respect to splinting activity during breathing.

The term "inspiration-expiration pattern segments" may refer to a data entity that describes one or more segments of an inspiration-expiration pattern of a monitored individual. For example, an inspiration-expiration pattern may comprise n segments, where each segment is associated with an expected musical note of an expected musical pattern. For example, consider where the expected musical pattern is Do-Re-Mi-Fa-So-La-Ti-Do. As an example, the first segment of the inspiration-expiration pattern segments may be associated with the musical note "Do". As another example, the second segment of the inspiration-expiration pattern segments may be associated with the musical note "Re". As yet another example, the fifth segment of the inspiration-expiration pattern segment may be associated with the musical note "So."

The term "interruption score generation machine learning model" may refer to a data object that is configured to describe parameters, hyper-parameters, and/or defined operations of a model that is configured to generate a predicted interruption score for a monitored individual in relation to a corresponding inspiration-expiration pattern segment based at least in part on an observed inspiration-expiration pattern for the monitored individual. In some embodiments, the interruption score generation machine learning model is a supervised machine learning model (e.g., a neural network model) that is trained using labeled data, where the supervised machine learning model is configured to generate a predicted interruption score, where the predicted interruption score is configured to be used to determine an inferred musical pattern that is in turn configured to be used to determine audio data configured to be presented using a client computing entity associated with a monitored individual. In some embodiments, the interruption score generation machine learning model is an unsupervised machine learning model (e.g., a clustering model). In some embodiments, the inputs to an interruption score generation machine learning model include an observed inspiration-expiration pattern, which may be a vector or a matrix. In some embodiments, the outputs of an interruption score generation machine learning model may include a predicted interruption score, which may be an atomic value or a vector.

The term "machine learning model" may refer to a data object that describes parameters, hyper-parameters, defined operations, and/or defined mappings of a model that is configured to process one or more prediction input values (e.g., one or more selected breathing measurements) in accordance with one or more trained parameters of the machine learning models in order to generate a prediction. An example of a machine learning model is a mathematically derived algorithm (MDA). An MDA may comprise any algorithm trained using training data to predict one or more outcome variables. Without limitation, an MDA, as used herein, may comprise machine learning frameworks including neural networks, support vector machines, gradient boosts, Markov models, adaptive Bayesian techniques, and statistical models (e.g., timeseries-based forecast models such as autoregressive models, autoregressive moving average models, and/or an autoregressive integrating moving average models). Additionally and without limitation, an MDA, as used in the singular, may include ensembles using multiple machine learning and/or statistical techniques.

The term "predicted interruption score" may refer to a data entity that is configured to describe a value that in turn describes the likelihood that a corresponding inspiration-expiration pattern segment includes splinting activity. The predicted interruption score may be generated by a trained interruption score generation machine learning model by processing an observed inspiration-expiration pattern segment for a corresponding monitored individual. For example, the predicted interruption score for a particular monitored individual may be generated by comparing the observed inspiration-expiration pattern segment with one or more expected inspiration-expiration patterns, processing utilizing a trained interruption score generation machine learning model. The predicted interruption score may be a Boolean value (e.g., where a one-valued predicted interruption score may represent that a corresponding observed inspiration-expiration pattern segment includes splinting activity, while a zero-valued predicted interruption score may represent that the corresponding observed inspiration-expiration pattern segment does not include splinting activity). In example embodiments, the predicted interruption score may be a non-Boolean value. In various embodiments, the predicted interruption score may be a vector. A predicted interruption score may be an output of a machine learning model. In some embodiments, the predicted interruption score for an observed inspiration-expiration pattern segment is determined by comparing the observed inspiration-expiration pattern segment with one or more expected inspiration-expiration patterns. In some of the noted embodiments, comparing the inspiration-expiration pattern segment with a particular expected inspiration-expiration pattern of the one or more expected inspiration-expiration patterns comprises determining a comparison score and determining the interruption score based at least in part on the comparison score. In some embodiments, a predicted interruption score describes whether an inspiration-expiration pattern segment comprise splinting activity.

The term "splinting activity" may refer to a data object that describes an occurrence of splinting (e.g., pain) in breathing of a monitored individual that may be determined by a trained interruption score generation machine learning model by processing an inspiration-expiration pattern segment for a corresponding monitored individual. In some embodiments, splinting activity for a particular monitored individual may be determined by processing (e.g., using a trained interruption score generation machine learning model) the inspiration-expiration pattern segment for the particular monitored individual as determined based at least in part on comparing one or more inspiration-expiration pattern segments of an observed inspiration-expiration pattern to a plurality of expected inspiration-expiration patterns.

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 depicts an architecture 100 for performing machine-learning-based optimized breathing therapy. The architecture includes a predictive data analysis computing entity 106, a breathing monitoring computing entity 101, a client computing entity 102, and/or one or more external computing entities 103. Communication between the noted computing entities may be facilitated using one or more communication networks. Examples of communication networks comprise any wired or wireless communication network including, for example, a wired or wireless local area network (LAN), personal area network (PAN), metropolitan area network (MAN), wide area network (WAN), short-range communication networks (e.g., Bluetooth networks), or the like, as well as any hardware, software and/or firmware required to implement it (such as, e.g., network routers, and/or the like).

The predictive data analysis computing entity 106 may be configured to receive observed breathing data from the breathing monitoring computing entity 101, process the observed breathing data to determine one or more prediction-based actions, and perform one or more prediction-based actions. In some embodiments, the predictive data analysis computing entity 106 may be configured to perform the one or more prediction-based actions by interacting with at least one of the breathing monitoring computing entity 101, the client computing entity 102, and the external computing entities 103.

For example, the predictive data analysis computing entity 106 may communicate splinting activity predictions generated based at least in part on the observed breathing data to the client computing entity 102 and/or the external computing entities 103. As another example, the predictive data analysis computing entity 106 may communicate one or more predicted interruption scores for one or more observed breathing data to the client computing entity 102 and/or the external computing entities 103. In some embodiments, some or all of the functions of the predictive data analysis computing entity 106 are performed by the breathing monitoring computing entity 101. In some of the noted embodiments, the breathing monitoring computing entity 101 is configured to receive observed breathing data from the breathing monitoring computing entity 101, process the observed breathing data to determine one or more prediction-based actions, and perform one or more prediction-based actions. In some embodiments, the predictive data analysis computing entity 106 may be configured to perform the one or more prediction-based actions by interacting with at least one of the breathing monitoring computing entity 101, client computing entity 102, and the external computing entities 103.

The breathing monitoring computing entity 101 may be configured to record breathing data for a monitored individual and to communicate the breathing data to at least one of the predictive data analysis computing entity 106, the client computing entity 102, and the external computing entities 103. In some embodiments, the breathing monitoring computing entity 101 is directly connected to the predictive data analysis computing entity 106. In some embodiments, the breathing monitoring computing entity 101 is configured to transmit the breathing data to the breathing monitoring computing entity 101, and the breathing monitoring computing entity 101 is configured to forward the breathing data received from the breathing monitoring computing entity 101 to the predictive data analysis computing entity 106. In some embodiments, the breathing monitoring computing entity 101 is configured to transmit the breathing data to the client computing entity 102, and the client computing entity 102 is configured to forward the breathing data received from the breathing monitoring computing entity 101 to the predictive data analysis computing entity 106. In some embodiments, the breathing monitoring computing entity 101 is configured to transmit the breathing data to the one or more external computing entities 103, and the one or more external computing entities 103 is configured to forward the breathing data received from the breathing monitoring computing entity 101 to the predictive data analysis computing entity 106.

In some embodiments, the breathing monitoring computing entity 101 includes one or more breathing sensors. In some embodiments, the breathing monitoring computing entity 101 includes a display that is configured to display a user interface. Such a user interface could include, for example, one or more of a display screen, an audio speaker, or a tactile output. In some embodiments, the user interface allows the user to communicate with the system. For example, in some embodiments, the system may include a keyboard, microphone, or touch screen allowing the user to enter information related to breathing pattern such as time, intensity of physical activity, stress level, energy level, location, environmental condition, and/or the like.

The client computing entity 102 may be configured to enable user display of the observed breathing data, the observed inspiration-expiration pattern, the predicted interruption score, and/or user configuration of predictive management actions performed by the predictive data analysis computing entity 106. Examples of client computing entities 102 include smartphone devices, tablet devices, personal computer devices, and/or the like. The client computing entity 102 may include a short-range communication network receiver (e.g., a Bluetooth receiver) that is configured to receive observed breathing data from the breathing monitoring computing entity 101. The client computing entity 102 may further be configured to provide the observed breathing data received from the breathing monitoring computing entity 101 to the predictive data analysis computing entity 106 and/or to receive one or more therapeutic notifications from the predictive data analysis computing entity 106.

In some embodiments, the client computing entity 102 is configured to perform some or all of the functionalities of the predictive data analysis computing entity 106. In some of the noted embodiments, the client computing entity 102 is configured to receive breathing data from the breathing monitoring computing entity 101, process the breathing data to determine one or more prediction-based actions, and perform the one or more prediction-based actions. In some embodiments, the breathing monitoring computing entity 101 may be configured to perform the one or more prediction-based actions by interacting with at least one of the breathing monitoring computing entity 101, client computing entity 102, and the external computing entities 103.

The external computing entities 103 may be configured to receive notification data and/or user interface data generated by the predictive data analysis computing entity 106 and perform corresponding actions based at least in part on the received data. For example, an external computing entity 103 may be configured to generate one or more physician alerts and/or one or more healthcare provider alerts based at least in part on the notification data provided by the predictive data analysis computing entity 106. As another example, an external computing entity 103 may be configured to generate one or more automated physician appointments, automated medical notes, automated prescription recommendations, and/or the like based at least in part on the notification data received from the predictive data analysis computing entity 106. As yet another example, an external computing entity 103 may be configured to enable an end-user device associated with the external computing entity 103 to display a user interface, where the user interface may have been generated based at least in part on the user interface data provided by the predictive data analysis computing entity 106. Examples of external computing entities 103 include hospital servers, physician server, laboratory servers, emergency room servers, urgent care center servers, research institution servers, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also comprise one or more network interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may comprise or be in communication with one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, another circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further comprise or be in communication with non-volatile media (also referred to as non-volatile storage, memory, memory storage, memory circuitry and/or similar terms used herein interchangeably). In one embodiment, the non-volatile storage or memory may comprise one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further comprise or be in communication with volatile media (also referred to as volatile storage, memory, memory storage, memory circuitry and/or similar terms used herein interchangeably). In one embodiment, the volatile storage or memory may also comprise one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also comprise one or more network interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may comprise or be in communication with one or more input elements, such as a keyboard input, a mouse input, a touch screen/display input, motion input, movement input, audio input, pointing device input, joystick input, keypad input, and/or the like. The predictive data analysis computing entity 106 may also comprise or be in communication with one or more output elements (not shown), such as audio output, video output, screen/display output, motion output, movement output, and/or the like.

Exemplary Breathing Monitoring Computing Entity

FIG. 3 provides an illustrative schematic representative of a breathing monitoring computing entity 101 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Breathing monitoring computing entities 101 can be operated by various parties. As shown in FIG. 3, the breathing monitoring computing entity 101 can comprise an antenna 312, a transmitter 304 (e.g., radio), a receiver 306 (e.g., radio), a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly, a power source 326, and a breathing sensor 328.

As noted above, in some embodiments, the breathing monitoring computing entity 101 may include one or more breathing sensors (such as breathing sensor 328). In some embodiments the one or more breathing sensors are incorporated in a wearable device. In various embodiments, the one or more breathing sensors are coupled and/or secured to and/or integrated into the wearable device. In some embodiments, the one or more breathing sensors are arranged over a particular area of the wearable device, such as an area expected to cover one or more target organs (e.g., diaphragm, heart, and/or lungs). For example, in some embodiments, the one or more breathing sensors comprise a stretch sensor configured to be positioned with respect to the diaphragm of the monitored individual to measure the inspiration and expiration pattern of the monitored individual as the diaphragm of the monitored individual contracts and expands as the monitored individual breathes. In some embodiments, the breathing monitoring computing entity 101 may be configured to record the inspiration and expiration pattern measured by the stretch sensor. The monitored inspiration and expiration pattern may be represented as breathing data.

The signals provided to and received from the transmitter 304 and the receiver 306, correspondingly, may comprise signaling information/data in accordance with air interface standards of applicable wireless systems. In this regard, the breathing monitoring computing entity 101 may be capable of operating with one or more air interface standards, communication protocols, modulation types, and access types. More particularly, the breathing monitoring computing entity 101 may operate in accordance with any of a number of wireless communication standards and protocols, such as those described above with regard to the predictive data analysis computing entity 106. In a particular embodiment, the breathing monitoring computing entity 101 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the breathing monitoring computing entity 101 may operate in accordance with multiple wired communication standards and protocols, such as those described above with regard to the predictive data analysis computing entity 106 via a network interface 320.

Via these communication standards and protocols, the breathing monitoring computing entity 101 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The breathing monitoring computing entity 101 can also download changes, add-ons, and updates, for instance, to its firmware, software (e.g., including executable instructions, applications, program modules), and operating system.

According to one embodiment, the breathing monitoring computing entity 101 may comprise location determining aspects, devices, modules, functionalities, and/or similar words used herein interchangeably. For example, the breathing monitoring computing entity 101 may comprise outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the breathing monitoring computing entity's 101 position in connection with a variety of other systems, including cellular towers, Wi-Fi access points, and/or the like. Similarly, the breathing monitoring computing entity 101 may comprise indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may comprise the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

In some embodiments, the transmitter 304 may include one or more Bluetooth transmitters. In some embodiments, the receiver 306 may include one or more Bluetooth receivers. The Bluetooth transmitters and/or the Bluetooth receivers may be configured to communicate with at least one of the client computing entity 102 and the predictive data analysis computing entity 106. In some embodiments, the transmitter 304 may include one or more WAN transmitters. In some embodiments, the receiver 306 may include one or more WAN receivers. The WAN transmitters and/or the WAN receivers may be configured to communicate with at least one of the client computing entity 102, the external computing entities 103, and the predictive data analysis computing entity 106.

The power source 326 may include electric circuitry configured to enable powering the breathing monitoring computing entity 101. The power source 326 may include one or more batteries, such as a rechargeable lithium-ion (Li-Ion) battery, that are configured to act as sources of electric power for the breathing monitoring computing entity 101.

The breathing monitoring computing entity 101 may also comprise a user interface (that can optionally comprise a display 316 coupled to a processing element 308) and/or a user input interface (coupled to a processing element 308). For example, the user interface may be a user application, browser, user interface, and/or similar words used herein interchangeably executing on and/or accessible via the breathing monitoring computing entity 101 to interact with and/or cause display of information/data from the predictive data analysis computing entity 106, as described herein. The user input interface can comprise any of a number of devices or interfaces allowing the breathing monitoring computing entity 101 to receive data, such as a keypad 318 (hard or soft), a touch display, voice/speech or motion interfaces, or other input device. In embodiments including a keypad 318, the keypad 318 can comprise (or cause display of) the conventional numeric (0-9) and related keys (#, *), and other keys used for operating the breathing monitoring computing entity 101 and may comprise a full set of alphabetic keys or set of keys that may be activated to provide a full set of alphanumeric keys. In addition to providing input, the user input interface can be used, for example, to activate or deactivate certain functions, such as screen savers and/or sleep modes.

The breathing monitoring computing entity 101 can also comprise volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the breathing monitoring computing entity 101. As indicated, this may comprise a user application that is resident on the entity or accessible through a browser or other user interface for communicating with the predictive data analysis computing entity 106 and/or various other computing entities.

In another embodiment, the breathing monitoring computing entity 101 may comprise one or more components or functionalities that are the same or similar to those of the predictive data analysis computing entity 106, as described in greater detail above. As will be recognized, these architectures and descriptions are provided for exemplary purposes only and are not limiting to the various embodiments.

Exemplary Client Computing Entity

FIG. 4 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 4, the client computing entity 102 can comprise an antenna 412, a transmitter 404 (e.g., radio), a receiver 406 (e.g., radio), a processing element 408 (e.g., CPLDs, microprocessors, multi-core processors, coprocessing entities, ASIPs, microcontrollers, and/or controllers) that provides signals to and receives signals from the transmitter 404 and receiver 406, correspondingly, and a power source 426.

The signals provided to and received from the transmitter 404 and the receiver 406, correspondingly, may comprise signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 420.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may comprise location determining aspects, devices, modules, functionalities, and/or similar words used herein interchangeably. For example, the client computing entity 102 may comprise outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may comprise indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may comprise the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

In some embodiments, the transmitter 404 may include one or more Bluetooth transmitters. In some embodiments, the receiver 406 may include one or more Bluetooth receivers. The Bluetooth transmitters and/or the Bluetooth receivers may be configured to communicate with the breathing monitoring computing entity 101. In some embodiments, the transmitter 404 may include one or more WAN transmitters. In some embodiments, the receiver 406 may include one or more WAN receivers. The WAN transmitters and/or the WAN receivers may be configured to communicate with the predictive data analysis computing entity 106.

The power source 426 may include electric circuitry configured to enable powering the client computing entity 102. The power source 426 may include one or more batteries, such as a nickel metal-hydride (NiMH) battery, that are configured to act as sources of electric power for the client computing entity 102.

The client computing entity 102 may also comprise a user interface (that can comprise a display 416 coupled to a processing element 408) and/or a user input interface (coupled to a processing element 408). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 418 (hard or soft), a touch display, voice/speech or motion interfaces, or other input device. In embodiments including a keypad 418, the keypad 418 can comprise (or cause display of) the conventional numeric (0-9) and related keys (#, *), and other keys used for operating the client computing entity 102 and may comprise a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also comprise volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may comprise a user application that is resident on the entity or accessible through a browser or other user interface for communicating with the predictive data analysis computing entity 106 and/or various other computing entities.

In another embodiment, the client computing entity 102 may comprise one or more components or functionalities that are the same or similar to those of the predictive data analysis computing entity 106, as described in greater detail above. As will be recognized, these architectures and descriptions are provided for exemplary purposes only and are not limiting to the various embodiments.

Exemplary External Computing Entity

FIG. 5 provides a schematic of an external computing entity 103 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also comprise one or more network interfaces 520 for communicating with various computing entities, such as by communicating data, content, information, and/or similar terms used herein interchangeably that can be transmitted, received, operated on, processed, displayed, stored, and/or the like.

As shown in FIG. 5, in one embodiment, the external computing entity 103 may comprise or be in communication with one or more processing elements 505 (also referred to as processors, processing circuitry, and/or similar terms used herein interchangeably) that communicate with other elements within the external computing entity 103 via a bus, for example. As will be understood, the processing element 505 may be embodied in a number of different ways.

For example, the processing element 505 may be embodied as one or more complex programmable logic devices (CPLDs), microprocessors, multi-core processors, coprocessing entities, application-specific instruction-set processors (ASIPs), microcontrollers, and/or controllers. Further, the processing element 505 may be embodied as one or more other processing devices or circuitry. The term circuitry may refer to an entirely hardware embodiment or a combination of hardware and computer program products. Thus, the processing element 505 may be embodied as integrated circuits, application specific integrated circuits (ASICs), field programmable gate arrays (FPGAs), programmable logic arrays (PLAs), hardware accelerators, another circuitry, and/or the like.

As will therefore be understood, the processing element 505 may be configured for a particular use or configured to execute instructions stored in volatile or non-volatile media or otherwise accessible to the processing element 505. As such, whether configured by hardware or computer program products, or by a combination thereof, the processing element 505 may be capable of performing steps or operations according to embodiments of the present invention when configured accordingly.

In one embodiment, the external computing entity 103 may further comprise or be in communication with non-volatile media (also referred to as non-volatile storage, memory, memory storage, memory circuitry and/or similar terms used herein interchangeably). In one embodiment, the non-volatile storage or memory may comprise one or more non-volatile storage or memory media 510, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In one embodiment, the external computing entity 103 may further comprise or be in communication with volatile media (also referred to as volatile storage, memory, memory storage, memory circuitry and/or similar terms used herein interchangeably). In one embodiment, the volatile storage or memory may also comprise one or more volatile storage or memory media 515, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 505. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 505 and operating system.

As indicated, in one embodiment, the external computing entity 103 may also comprise one or more network interfaces 520 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may comprise or be in communication with one or more input elements, such as a keyboard input, a mouse input, a touch screen/display input, motion input, movement input, audio input, pointing device input, joystick input, keypad input, and/or the like. The predictive data analysis computing entity 106 may also comprise or be in communication with one or more output elements (not shown), such as audio output, video output, screen/display output, motion output, movement output, and/or the like.

V. EXEMPLARY METHOD OPERATIONS

As described below, various embodiments of the present invention address technical challenges related to efficiently and effectively performing breathing therapy based at least in part on observed breathing data for a monitored individual. The disclosed techniques improve the efficiency and effectiveness of optimized breathing therapy by utilizing an interruption score generation machine learning model that is configured to compare an observed inspiration-expiration pattern segment that is generated based at least in part on observed breathing data with one or more expected inspiration-expiration patterns. The interruption score generation machine learning models utilize comparison operations that may, in at least some embodiments, reduce or eliminate the need for computationally expensive training operations in order to generate the noted interruption score generation machine learning models.

By reducing or eliminating the noted training operations, various embodiments of the present invention: (i) reduces or eliminates the computational operations needed for training and thus improves the computational efficiency of performing optimized breathing therapy, (ii) reduces or eliminates the need for storage resources to train/generate interruption score generation machine learning models and thus improves storage efficiency of performing optimized breathing therapy, and (iii) reduces or eliminates the need for transmitting extensive training data needed to generate interruption score generation machine learning models and thus improves transmission/network efficiency of performing optimized breathing therapy. Via the noted advantages, various embodiments of the present invention make substantial technical contributions to the fields of breathing therapy in particular and healthcare-related predictive data analysis in general.

FIG. 6 is a flowchart diagram of an example process for performing a machine-learning-based optimized breathing therapy, in accordance with some embodiments discussed herein.

The process 600 begins at step/operation 601 when the predictive data analysis computing entity 106 identifies an observed inspiration-expiration pattern. An observed inspiration-expiration pattern may describe the breathing pattern of a monitored individual with respect to an inspiration-expiration cycle of the monitored individual. As an example, the monitored individual may be an individual without an atelectasis condition. As another example, the monitored individual may be an individual with an atelectasis condition. An individual with an atelectasis condition may experience pain (e.g. splinting activity) during breathing. In some embodiments, an observed inspiration-expiration pattern may be identified based at least in part on observed breathing data of a monitored individual.

In some embodiments, the observed inspiration-expiration pattern may describe a graphical representation (e.g., waveform) of the inspiration-expiration cycle of a monitored individual. Operational examples of an observed inspiration-expiration pattern are depicted in FIGS. 7A-7C. As shown in FIGS. 7A-7C, an observed inspiration-expiration pattern may represent a substantially triangular inspiration-expiration pattern. The substantially triangular inspiration-expiration pattern may comprise a left half-triangular pattern that is associated with a detected inspiration pattern for an observed breathing data of a monitored individual. For example, the left-half triangular pattern may describe a positive slope (e.g., upward progression) that corresponds to the inspiration pattern for the observed breathing data of the monitored individual. Additionally, the substantially triangular inspiration-expiration pattern may comprise a right half triangular pattern that is associated with a detected expiration pattern for the observed breathing data of the monitored individual. For example, the right half triangular pattern may describe a negative slope that corresponds to the expiration pattern for the observed breathing data of the monitored individual. As shown in FIGS. 7B and 7C, an observed inspiration-expiration pattern may include one or more interruptions in the upward progression of the left-half triangular pattern and/or the right-half triangular pattern, where the one or more interruptions may be indicative of pain (e.g., splinting pain associated with splinting activity) experienced by the corresponding monitored individual during breathing. As shown in FIGS. 7B and 7C, the peak lung volume of the monitored individual may not be achieved due to the one or more interruptions/pain.

In some embodiments, the step/operation 601 may be performed in accordance with the process that is depicted in FIG. 8, which is an example process for identifying an observed inspiration-expiration pattern based at least in part on an observed breathing data. The process begins at step/operation 801 when the predictive data analysis computing entity 106 identifies one or more breathing data segments of the observed breathing data. An observed breathing data may describe breathing measurements associated with an inspiration-expiration cycle. For example, in some embodiments, the observed breathing data may comprise an observed breathing timeseries data object that describes recorded breathing measurements for the monitored individual over an inspiration-expiration cycle of the monitored individual. As an example, in some embodiments, the breathing measurements may include voltage signals corresponding to inspiration and/or expiration. For example, the voltage signals may correspond to the contraction and expansion of the diaphragm of the monitored individual.

In some embodiments, the observed breathing data may be calculated using one or more breathing sensors. For example, the breathing sensors may be configured to record breathing measurements for the monitored individual and to transmit (e.g., wirelessly, through a wired transmission medium, and/or the like) the recorded breathing measurements to one or more computing entities (e.g., the predictive data analysis computing entity 106, the breathing monitoring computing entity 101, the client computing entity 102, and/or the external computing entities 103) configured to store the breathing measurements and/or determine an observed inspiration-expiration pattern based at least in part on the breathing measurements.

In some embodiments, the breathing sensors may include breathing sensors that are in direct contact with the monitored individual's body as well as breathing sensors that are not in direct contact with the monitored individual's body. For example, in some embodiments, the one or more breathing sensors may be integrated and/or secured to a wearable device (e.g., vest, shirt, body band, and/or the like). In some embodiments, the one or more breathing sensors may include one or more stretch sensors integrated and/or secured to a stretchable wearable device positioned with respect to one or more target organs (e.g., diaphragm) of the monitored individual. For example, in some embodiments, the one or more stretch sensors may be configured to measure the contraction of the diaphragm and/or expansion of the diaphragm of the monitored individual as the monitored individual inspires and expires. For example, in some embodiments, the breathing data may comprise a first sensory indicator of a diaphragm expansion for the monitored individual and a second indicator of a diaphragm contraction for the monitored individual.

At step/operation 802, for each observed breathing data segment, the predictive data analysis computing entity 106 determines a pattern matching score based at least in part on comparing the breathing data segment to one or more expected inspiration-expiration patterns. An expected inspiration-expiration pattern may describe a normal breathing pattern of a monitored individual with respect to an inspiration-expiration cycle of the monitored individual. For example, an expected inspiration-expiration pattern may describe a breathing pattern of a monitored individual with respect to an inspiration-expiration cycle, where splinting activity was not experienced by the monitored individual during the inspiration-expiration cycle. As an example, an expected inspiration-expiration pattern may be generated by processing breathing data measured during a normal inspiration-expiration cycle of the monitored individual. For example, the breathing data may be measured during an inspiration-expiration cycle of the monitored individual under the supervision of a physician and/or the like, where the monitored individual inspires and expires without an interruption in the inspiration-expiration cycle that is indicative of splinting activity. Accordingly, the inspiration-expiration pattern may not include interruptions in the inspiration-expiration pattern that is indicative of splinting activity. As another example, an expected inspiration-expiration pattern for a particular monitored individual may be generated, utilizing a machine learning model, based at least in part on one more expected inspiration-expiration patterns of other monitored individuals.

At step/operation 803, the predictive data analysis computing entity 106 determines the observed inspiration-expiration pattern based at least in part on each pattern matching score. In some embodiments, the observed inspiration-expiration pattern is associated with an expected musical pattern (e.g., musical rhythm), where the expected musical pattern is associated with a plurality of expected musical notes. For example, in some embodiments the observed inspiration-expiration pattern is associated with an expected musical pattern: Do-Re-Mi-Fa-So-La-Ti-Do, that is associated with musical notes "Do" "Re" "Mi" "Fa" "So" "La" "Ti" "Do."

In some embodiments, the expected musical pattern maps/correlates linearly with the inspiration portion of the expected inspiration-expiration pattern of the monitored individual. For example, in some embodiments, the expected starting point of the inspiration of the monitored individual may correlate with the starting point of the musical pattern (e.g., first musical note, the initial "DO," of the musical pattern) and the expected end of the inspiration (e.g., beginning of expiration) of the monitored individual may correlate with the end of the musical pattern (e.g., last musical note, the second "DO," of the expected musical pattern). In some embodiments, the expected musical pattern may serve as an indicator for a breathing therapy session. For example, in some embodiments, the expected musical pattern may serve as the primary indicator of the progress of a monitored individual with respect to splinting activity during breathing.

Returning to FIG. 6, at step/operation 602, the predictive data analysis computing entity 106 generates a plurality of inspiration-expiration pattern segments of the observed inspiration-expiration pattern, where each inspiration-expiration pattern segment is associated with an expected musical note of the plurality of expected musical notes (e.g., "Do" "Re" "Mi" "Fa" "So" "La" "Ti" "Do"). In some embodiments, generating the plurality of inspiration-expiration pattern segments comprise identifying an expected inspiration-expiration pattern (where the expected inspiration-expiration pattern is associated with a plurality of expected inspiration-expiration pattern segments) and generating the plurality of inspiration-expiration pattern segments based at least in part on the plurality of expected inspiration-expiration pattern segments.

At step/operation 603, for each inspiration-expiration pattern segment, the predictive data analysis computing entity 106 maps the inspiration-expiration pattern segment to an inferred musical note. In some embodiments, the step/operation 603 may be performed in accordance with the process that is depicted in FIG. 9, which is an example process for mapping an inspiration-expiration pattern segment to an inferred musical note.

The process begins at step/operation 901 when the predictive data analysis computing entity 106 determines a predicted interruption score. In some embodiments, the predictive data analysis computing entity 106 determines the predicted interruption score utilizing a machine learning model. In some embodiments, the predictive data analysis computing entity 106 determines the predicted interruption score utilizing an interruption score generation machine learning model. In some embodiments, determining the predicted interruption score comprises identifying a plurality of expected inspiration-expiration patterns, generating a comparison score by comparing the inspiration-expiration pattern segment to the plurality of expected inspiration-expiration patterns, and generating the interruption score based at least in part on the comparison score.

At step/operation 902, the predictive data analysis computing entity 106 determines an inferred musical note based at least in part on the predicted interruption score. In some embodiments, determining the inferred musical note comprises determining whether the predicted interruption score for the particular inspiration-expiration pattern segment satisfies or fails to satisfy an interruption score threshold, and determining the inferred musical note based at least in part on the response.

In some embodiments, in response to determining that the predicted interruption score fails to satisfy the interruption score threshold, the predictive data analysis computing entity 106, determines the inferred musical note for the particular inspiration-expiration pattern segment based at least in part on an off-note musical note that is different than the expected musical note for the particular inspiration-expiration pattern segment. In some embodiments, the off-note may be a buzz, a distinct off-note sound, and/or the like. For example, consider where an observed inspiration-expiration pattern segment is associated with an expected musical note "Ti" and the predictive data analysis computing entity 106 determines that the predicted interruption score for the observed inspiration-expiration pattern segment fails to satisfy the interruption score threshold. In the noted example, the predictive data analysis computing entity 106 may identify an off-note (different from "Ti") as the inferred musical note.

Additionally and/or alternatively, in some embodiments, in response to determining that the predicted interruption score satisfies the interruption score threshold, the predictive data analysis computing entity 106, determines the inferred musical note for the particular inspiration-expiration pattern segment based at least in part on a musical note that is substantially the same as the expected musical note for the particular inspiration-expiration pattern segment. As an example, consider where an observed inspiration-expiration pattern segment is associated with an expected musical note "Ti" and the predictive data analysis computing entity 106 determines that the predicted interruption score for the observed inspiration-expiration pattern segment satisfies the interruption score threshold. In the noted example, the predictive data analysis computing entity 106 may identify "Ti" as the inferred musical note. As another example, consider where an observed inspiration-expiration pattern segment is associated with an expected musical note "La" and the predictive data analysis computing entity 106 determines that the predicted interruption score for the observed inspiration-expiration pattern segment satisfies the interruption score threshold. In the noted example, the predictive data analysis computing entity 106 may identify "La" as the inferred musical note.

At step/operation 903, the predictive data analysis computing entity 106 maps the inspiration-expiration pattern segment to the inferred musical note. For example, consider where the inferred musical note for the inspiration-expiration pattern segment is "Re", the predictive data analysis computing entity 106 may be configured to map "Re" to the inspiration-expiration pattern segment. In the noted example, the inspiration-expiration pattern segment of the inspiration-expiration pattern may be indicated/represented by the musical note "Re".

At step/operation 604, the predictive data analysis computing entity 106 generates an inferred musical pattern for the observed inspiration-expiration pattern based at least in part on each inferred musical note. As noted, in some embodiments, the expected musical pattern may serve as an indicator (e.g., primary indicator) in a breathing therapy session with respect to splinting activity in the inspiration-expiration cycle of a monitored individual. In some embodiments, an inferred musical pattern for an observed inspiration-expiration pattern that matches the expected musical pattern may indicate a successful completion of the musical pattern which corresponds to a successful inspiration-expiration cycle (e.g., inspiration-expiration cycle without interruption in the inspiration that is indicative of splinting activity).

An inferred musical pattern may be deemed to match the expected musical pattern where each of the inferred musical note of the plurality of musical notes associated with the inferred musical pattern is the corresponding expected musical note and where the inferred musical pattern comprise each of the expected musical notes of the plurality of expected musical notes of the expected musical pattern. In some embodiments, in response to a successful completion of the musical pattern, the predictive data analysis computing entity 106 may generate a distinct musical note to indicate successful completion of the expected musical pattern and/or successful breathing through a pain point in the inspiration of the monitored individual. For example, in some embodiments, the predictive data analysis computing entity may generate a cheerful and/or pleasant sound to indicate the successful completion of the expected musical pattern and/or successful breathing through a pain point in the inspiration of the monitored individual.

In some embodiments an inferred musical pattern for the observed inspiration-expiration pattern that does not match the expected musical pattern may be indicative of an unsuccessful completion of the expected musical pattern corresponding to an unsuccessful inspiration-expiration cycle (e.g., inspiration-expiration cycle associated with one or more interruptions in the inspiration of the monitored individual that is indicative of splinting activity). An inferred musical pattern may be deemed as not matching the expected musical pattern when one or more of the inferred musical notes is an off-note.

Operational examples of inferred musical patterns are depicted in FIGS. 10A and 10B. FIG. 10A depicts an inferred musical pattern for an observed inspiration-expiration pattern that matches the expected musical pattern. FIG. 10B depicts an inferred musical pattern that does not match the expected musical pattern. As depicted in FIG. 10A, for each observed inspiration-expiration pattern segment, the inferred musical note corresponds to the expected musical note for the observed inspiration-expiration pattern segment and the inferred musical pattern comprise each of the expected musical notes of the plurality of expected musical notes associated with the expected musical pattern. Accordingly, FIG. 10A may be indicative of a successful completion of the musical pattern (e.g., musical rhythm), thus indicative of a successful completion of the inspiration-expiration cycle. As depicted in FIG. 10B, the inferred musical note for the inspiration-expiration pattern segment associated with the expected musical note "Ti" is an off-note, where the predictive data analysis computing entity 106 had determined that the predicted interruption score failed to satisfy the interruption score threshold. Accordingly, FIG. 10B may be indicative of an unsuccessful completion of the expected musical pattern, thus indicative of an unsuccessful inspiration-expiration cycle.

In some embodiments, the inferred musical pattern as compared to the expected musical pattern may serve as a pain point identifier in the observed inspiration-expiration pattern. Additionally and/or alternatively, the inferred musical pattern as compared to the expected musical pattern may serve a memory system for the monitored individual to guide the monitored individual through pain points. For example, consider where the inferred musical note for the inspiration-expiration pattern segment associated with the expected musical note "Ti" is an off-note. In the noted example, the off note may indicate when the monitored individual is experiencing splinting, thus serving as a guide for the monitored individual to attempt to breathe through "Ti" (e.g., the pain point). In some embodiments, the inferred musical pattern as compared to the expected musical pattern may be indicative of the progress of the monitored individual with respect to splinting activity.

At step/operation 605, the predictive data analysis computing entity 106 generates audio data based at least in part on the inferred musical pattern. In some embodiments, the audio data is configured to be presented using a client computing entity associated with the monitored individual. In some embodiments, the predictive data analysis computing entity 106 may present the audio data to the monitored individual during a therapy session. In some embodiments, the predictive data analysis computing entity 106 may present the audio data to the monitored individual during a corresponding inspiration-expiration cycle of the monitored individual.

At step/operation 606, the predictive data analysis computing entity 106 performs one or more prediction-based actions based at least in part on the predicted interruption score. Examples of prediction-based actions includes displaying a user interface that displays one or more notifications. For example, as depicted in FIG. 11, the predictive output user interface 1100 may be configured to display one or more notifications relating to the progress of the monitored individual with respect to splinting activity during therapy sessions. As depicted in FIG. 11, the predictive output user interface may comprise notification to the monitored individual that at the current therapy session the monitored individual was able to breathe through and up to the musical note "La." Additionally, the predictive output user interface may comprise notification indicating that the next goal is to attempt to breathe through the musical note "Ti." In some embodiments the predictive output user interface may comprise notification that the monitored individual achieved a successful inspiration-expiration cycle.

In accordance with the above-described techniques, various embodiments of the present invention: (i) allow the patient an easy and memorable musical pattern to practice continued self-therapy, (ii) allow for an easy knowledge transfer to the physician and/or the like, (iii) accommodate the visually impaired, (iv) may be implemented with an integrated Continuous Positive Airway Pressure (CPAP) to assist inspiration, (v) may be used as a general lung health trainer, and (v) may be used for an asthma attack breathing guide to overcome an episode of asthma attack.

Accordingly, various embodiments of the present invention address technical challenges related to efficiently and effectively performing breathing therapy based at least in part on observed breathing data for a monitored individual. The disclosed techniques improve the efficiency and effectiveness of optimized breathing therapy by utilizing an interruption score generation machine learning model that is configured to compare an observed inspiration-expiration pattern segment that is generated based at least in part on observed breathing data with the one or more expected inspiration-expiration patterns. The interruption score generation machine learning models utilize comparison operations that may, in at least some embodiments, reduce or eliminate the need for computationally expensive training operations in order to generate the noted interruption score generation machine learning models. By reducing or eliminating the noted training operations, various embodiments of the present invention: (i) reduces or eliminates the computational operations needed for training and thus improves the computational efficiency of performing optimized breathing therapy, (ii) reduces or eliminates the need for storage resources to train/generate interruption score generation machine learning models and thus improves storage efficiency of performing optimized breathing therapy, and (iii) reduces or eliminates the need for transmitting extensive training data needed to generate interruption score generation machine learning models and thus improves transmission/network efficiency of performing optimized breathing therapy. Via the noted advantages, various embodiments of the present invention make substantial technical contributions to the fields of breathing therapy in particular and healthcare-related predictive data analysis in general.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
identifying, by one or more processors, an observed inspiration-expiration pattern based at least in part on observed breathing data for a monitored individual, wherein the observed inspiration-expiration pattern is associated with an expected musical pattern, and wherein the expected musical pattern is associated with a plurality of expected musical notes;
generating, by the one or more processors and based at least in part on the observed inspiration-expiration pattern, a plurality of inspiration-expiration pattern segments of the observed inspiration-expiration pattern, wherein an inspiration-expiration pattern segment of the plurality of inspiration-expiration pattern segments is associated with an expected musical note of the plurality of expected musical notes;
determining, by the one or more processors and using an interruption score generation machine learning model, a predicted interruption score for the inspiration-expiration pattern segment, wherein the predicted interruption score describes a likelihood that the inspiration-expiration pattern segment comprises a splinting activity;
determining, by the one or more processors, an inferred musical note based at least in part on the predicted interruption score;
generating, by the one or more processors, an inferred musical pattern for the observed inspiration-expiration pattern based at least in part on the inferred musical note;
generating, by the one or more processors, audio data based at least in part on the inferred musical pattern; and
initiating, by the one or more processors and using a client computing entity, presentation of the audio data to the monitored individual.

2. The computer-implemented method of claim 1, wherein determining the inferred musical note for the inspiration-expiration pattern segment comprises:
determining, by the one or more processors, whether the predicted interruption score for the inspiration-expiration pattern segment satisfies an interruption score threshold, and
in response to determining that the predicted interruption score fails to satisfy the interruption score threshold, determining, by the one or more processors, the inferred musical note for the inspiration-expiration pattern segment based at least in part on an off-note musical note that is different than the expected musical note for the inspiration-expiration pattern segment.

3. The computer-implemented method of claim 1, wherein determining the inferred musical note for the inspiration-expiration pattern segment comprises:
determining, by the one or more processors, whether the predicted interruption score for the inspiration-expiration pattern segment satisfies an interruption score threshold, and
in response to determining that the predicted interruption score satisfies the interruption score threshold, determining, by the one or more processors, the inferred musical note for the inspiration-expiration pattern segment based at least in part on a musical note that is substantially similar to the expected musical note for the inspiration-expiration pattern segment.

4. The computer-implemented method of claim 1, wherein identifying the observed inspiration-expiration pattern comprises:
identifying, by the one or more processors, one or more breathing data segments of the observed breathing data;
for a breathing data segment of the one or more breathing data segments, determining, by the one or more processors, a pattern matching score based at least in part on comparing the breathing data segment to one or more expected inspiration-expiration patterns; and
determining, by the one or more processors, the observed inspiration-expiration pattern based at least in part on the pattern matching score.

5. The computer-implemented method of claim 1, wherein generating the plurality of inspiration-expiration pattern segments comprises:
identifying, by the one or more processors, an expected inspiration-expiration pattern for the observed inspiration-expiration pattern, wherein the expected inspiration-expiration pattern is associated with a plurality of expected inspiration-expiration pattern segments; and
generating, by the one or more processors, the plurality of inspiration-expiration pattern segments based at least in part on the plurality of expected inspiration-expiration pattern segments.

6. The computer-implemented method of claim 1, wherein determining the predicted interruption score for the inspiration-expiration pattern segment comprises:
determining, by the one or more processors and using the interruption score generation machine learning model, a comparison score by comparing the inspiration-expiration pattern segment to a plurality of expected inspiration-expiration patterns; and
determining the predicted interruption score based at least in part on the comparison score.

7. The computer-implemented method of claim 1, wherein the expected musical pattern comprises Do-Re-Mi-Fa-So-La-Ti-Do.

8. The computer-implemented method of claim 1, wherein a particular inferred musical pattern that matches the expected musical pattern is deemed a successful completion of the observed inspiration-expiration pattern indicative of a successful inspiration-expiration cycle.

9. A computing system comprising:
one or more processors; and
at least one memory storing processor-executable instructions that, when executed by any one or more of the one or more processors, causes the one or more processors to perform operations comprising:
identifying an observed inspiration-expiration pattern based at least in part on observed breathing data for a monitored individual, wherein the observed inspiration-expiration pattern is associated with an expected musical pattern, and wherein the expected musical pattern is associated with a plurality of expected musical notes;
generating, based at least in part on the observed inspiration-expiration pattern, a plurality of inspiration-expiration pattern segments of the observed inspiration-expiration pattern, wherein an inspiration-expiration pattern segment of the plurality of inspiration-expiration pattern segments is associated with an expected musical note of the plurality of expected musical notes;
determining, using an interruption score generation machine learning model, a predicted interruption score for the inspiration-expiration pattern segment, wherein the predicted interruption score describes a likelihood that the inspiration-expiration pattern segment comprises a splinting activity;

determining an inferred musical note based at least in part on the predicted interruption score;

generating an inferred musical pattern for the observed inspiration-expiration pattern based at least in part on the inferred musical note;

generating audio data based at least in part on the inferred musical pattern; and initiating, using a client computing entity, presentation of the audio data to the monitored individual.

10. The system of claim 9, wherein determining the inferred musical note for the inspiration-expiration pattern segment comprises:

determining whether the predicted interruption score for the inspiration-expiration pattern segment satisfies an interruption score threshold, and in response to determining that the predicted interruption score fails to satisfy the interruption score threshold, determining the inferred musical note for the inspiration-expiration pattern segment based at least in part on an off-note musical note that is different than the expected musical note for the inspiration-expiration pattern segment.

11. The system of claim 9, wherein determining the inferred musical note for the inspiration-expiration pattern segment comprises:

determining whether the predicted interruption score for the inspiration-expiration pattern segment satisfies an interruption score threshold, and in response to determining that the predicted interruption score satisfies the interruption score threshold, determining the inferred musical note for the inspiration-expiration pattern segment based at least in part on a musical note that is substantially similar to the expected musical note for the inspiration-expiration pattern segment.

12. The system of claim 9, wherein identifying the observed inspiration-expiration pattern comprises:

identifying one or more breathing data segments of the observed breathing data;

for a breathing data segment of the one or more breathing data segments, determining a pattern matching score based at least in part on comparing the breathing data segment to one or more expected inspiration-expiration patterns; and determining the observed inspiration-expiration pattern based at least in part on the pattern matching score.

13. The system of claim 9, wherein generating the plurality of inspiration-expiration pattern segments comprises:

identifying an expected inspiration-expiration pattern for the observed inspiration-expiration pattern, wherein the expected inspiration-expiration pattern is associated with a plurality of expected inspiration-expiration pattern segments; and generating the plurality of inspiration-expiration pattern segments based at least in part on the plurality of expected inspiration-expiration pattern segments.

14. The system of claim 9, wherein determining the predicted interruption score for the inspiration-expiration pattern segment comprises:

determining, using the interruption score generation machine learning model, a comparison score by comparing the inspiration-expiration pattern segment to a plurality of expected inspiration-expiration patterns; and determining the predicted interruption score based at least in part on the comparison score.

15. The system of claim 9, wherein the expected musical pattern comprises Do-Re-Mi-Fa-So-La-Ti-Do.

16. The system of claim 9, wherein a particular inferred musical pattern that matches the expected musical pattern is deemed a successful completion of the observed inspiration-expiration pattern indicative of a successful inspiration-expiration cycle.

17. One or more non-transitory computer-readable storage media including instructions that, when executed by one or more processors, cause the one or more processors to:

identify an observed inspiration-expiration pattern based at least in part on observed breathing data for a monitored individual, wherein the observed inspiration-expiration pattern is associated with an expected musical pattern, and wherein the expected musical pattern is associated with a plurality of expected musical notes;

generate, based at least in part on the observed inspiration-expiration pattern, a plurality of inspiration-expiration pattern segments of the observed inspiration-expiration pattern, wherein an inspiration-expiration pattern segment of the plurality of inspiration-expiration pattern segments is associated with an expected musical note of the plurality of expected musical notes;

determine, using an interruption score generation machine learning model, a predicted interruption score for the inspiration-expiration pattern segment, wherein the predicted interruption score describes a likelihood that the inspiration-expiration pattern segment includes splinting activity;

determine an inferred musical note based at least in part on the predicted interruption score;

generate an inferred musical pattern for the observed inspiration-expiration pattern based at least in part on the inferred musical note;

generate audio data based at least in part on the inferred musical pattern; and initiating, using a client computing entity, presentation of the audio data to the monitored individual.

18. The one or more non-transitory computer-readable storage media of claim 17, wherein determining the inferred musical note for the inspiration-expiration pattern segment comprises:

determining whether the predicted interruption score for the inspiration-expiration pattern segment satisfies an interruption score threshold, and in response to determining that the predicted interruption score fails to satisfy the interruption score threshold, determining the inferred musical note for the inspiration-expiration pattern segment based at least in part on an off-note musical note that is different than the expected musical note for the inspiration-expiration pattern segment.

19. The one or more non-transitory computer-readable storage media of claim 17, wherein determining the inferred musical note for the inspiration-expiration pattern segment comprises:

determining whether the predicted interruption score for the inspiration-expiration pattern segment satisfies an interruption score threshold, and in response to determining that the predicted interruption score satisfies the interruption score threshold, determining the inferred musical note for the inspiration-expiration pattern segment based at least in part on a musical note that is substantially similar to the expected musical note for the inspiration-expiration pattern segment.

20. The one or more non-transitory computer-readable storage media of claim 17, wherein identifying the observed inspiration-expiration pattern comprises:
identifying one or more breathing data segments of the observed breathing data;
for a breathing data segment of the one or more breathing data segments, determining a pattern matching score based at least in part on comparing the breathing data segment to one or more expected inspiration-expiration patterns; and
determining the observed inspiration-expiration pattern based at least in part on the pattern matching score.

* * * * *